United States Patent
Hyman

(10) Patent No.: US 8,990,337 B2
(45) Date of Patent: Mar. 24, 2015

(54) TRACKING ADVERTISING ABANDONMENT RATES

(75) Inventor: Michael Hyman, Bellevue, WA (US)

(73) Assignee: Collective, Inc., New York, NY (US)

( * ) Notice: Subject to any disclaimer, the term of this patent is extended or adjusted under 35 U.S.C. 154(b) by 527 days.

(21) Appl. No.: 12/795,524

(22) Filed: Jun. 7, 2010

(65) Prior Publication Data

US 2010/0312854 A1     Dec. 9, 2010

Related U.S. Application Data

(60) Provisional application No. 61/184,924, filed on Jun. 8, 2009.

(51) Int. Cl.
*G06F 15/16* (2006.01)
*G06Q 30/02* (2012.01)

(52) U.S. Cl.
CPC .................................. *G06Q 30/02* (2013.01)
USPC ............... 709/217; 709/206; 709/224; 705/5; 705/14.16; 705/14.41; 705/37; 705/28

(58) Field of Classification Search
CPC ............. H04L 9/00; H04L 67/28; G09C 1/00
USPC ...................... 709/217, 224; 705/14.41, 14.16
See application file for complete search history.

(56) References Cited

U.S. PATENT DOCUMENTS

| 7,720,963 | B2 | 5/2010 | Blumenau | |
| 7,970,672 | B2* | 6/2011 | Mendelovich et al. | 705/35 |
| 2001/0047297 | A1* | 11/2001 | Wen | 705/14 |
| 2003/0088483 | A1* | 5/2003 | Moyer | 705/27 |
| 2007/0055554 | A1* | 3/2007 | Sussman et al. | 705/5 |
| 2008/0195476 | A1* | 8/2008 | Marchese et al. | 705/14 |

OTHER PUBLICATIONS

"Why Web Performance Matters: Is Your Site Driving Customers Away"—Gomez, May 2009.*

* cited by examiner

*Primary Examiner* — Randy Scott
(74) *Attorney, Agent, or Firm* — Morgan Lewis & Bockius LLP

(57) ABSTRACT

A method for tracking abandonment rates. A client computer may send a first message to a server requesting a content unit to be incorporated into a web page. The client computer may receive, from the server computer, the content unit including deliverable content and a communications element configured to send messages generated by the content unit to the server. After delivering the deliverable content, the client computer may send a second message to the server via the communications element, the second message indicating that the delivery of the deliverable content has been completed.

17 Claims, 4 Drawing Sheets

TRACKING ADVERTISING ABANDONMENT RATES

RELATED APPLICATION INFORMATION

This patent claims priority from Provisional Application No. 61/184,924, filed Jun. 8, 2009, entitled "Tracking Advertising Abandonment Rates", incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to placing advertisements in web pages accessed via the Internet, and specifically to tracking advertisements that are abandoned without being viewed.

2. Description of the Related Art

The Internet and the World Wide Web have made a vast body of knowledge available to anyone with a computer and a network connection. As of 2009, the World Wide Web included about 180 million websites.

Within this patent, the term "publisher" means a company, government entity, or other organization that provides a web site accessible via the internet. Publishers may provide all of the content of their web sites, or may embed content provided by other sources. For example, many websites are supported, at least in part, by advertisements presented within web pages. Publishers of ad-supported web sites may sell space on their web pages for advertisements.

In this patent, an "ad broker" is a company that places ads in publisher web pages. The ad broker may broker such ad space between publishers and advertisers. The ad broker may act as a media buyer that purchases ad space from publishers and sells the space to various advertisers or advertising agencies.

A publisher may be paid and an advertiser may be charged for each "impression", or each time the advertiser's ad appears on the publisher's website. The publisher may be paid, and the advertiser may be charged, an additional "click-through" amount for each viewer who interacts with the ad, for example by clicking on the ad or an element within the ad.

The number of ad impressions is typically determined by the number of calls to an ad server to load the ad, which is not necessarily the same as the number of times that the ad is actually seen by a viewer. This is because a web page takes time to render, and viewers will often leave a page before the rendering is complete. When a viewer leaves a web page before the web page is fully displayed, the viewer is said to "abandon" the page. Since publisher web pages may load and display ads last, an abandoned page may result in one or more abandoned ads. Because of abandonment, the number of calls to the ad server to load an ad is typically greater than the number of actual viewings of the ad.

To improve the accuracy of counting impressions of an ad, the ad may contain one or more embedded objects that have to be called from the ad server while the ad is being rendered. For example, the ad may contain a single pixel image, commonly called a one-by-one image, that has to be loaded from the ad server. The call to load this image may be logged by the ad server as an indication that the rendering of the ad has progressed to at least some extent. This approach is not completely accurate since, in some circumstances, web browsers may not load one-by-one images. In addition, the loading of an image within an ad can be asynchronous with displaying the ad to the viewer. Sometimes, a one-by-one image is called sufficiently in advance of displaying the ad such that the ad can be abandoned after the one-by-one image is called.

Traditionally, web pages were written in Hypertext Markup Language (HTML). Currently, to provide a variety of content including audio, video, and/or animation, web pages may be written in a combination of HTML and other platforms including Extended Markup Language (XML), Java, and Adobe Flash. Most ads to be embedded in web pages are written using Flash. Flash is a multimedia platform including a suite of program instructions, data structures, and file formats used to create objects that can be played or rendered by a Flash player coupled to a web browser. Flash supports text, graphics, animation, audio, video, and/or viewer interaction.

Most web page ads conform to standards set by an industry association, the Interactive Advertising Bureau (IAB). The IAB has defined a plurality of standard ad formats, commonly referred to as "ad units". Within this patent, the term "ad unit object" refers to the programming code and associated data that causes an ad unit to be displayed within a web page. Conventional ad unit objects are usually Flash objects hosted on servers operated by an advertising broker or a third-party provider. An ad unit object may be written by the advertising broker, the third-party provider, or the advertiser.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Figure 1:
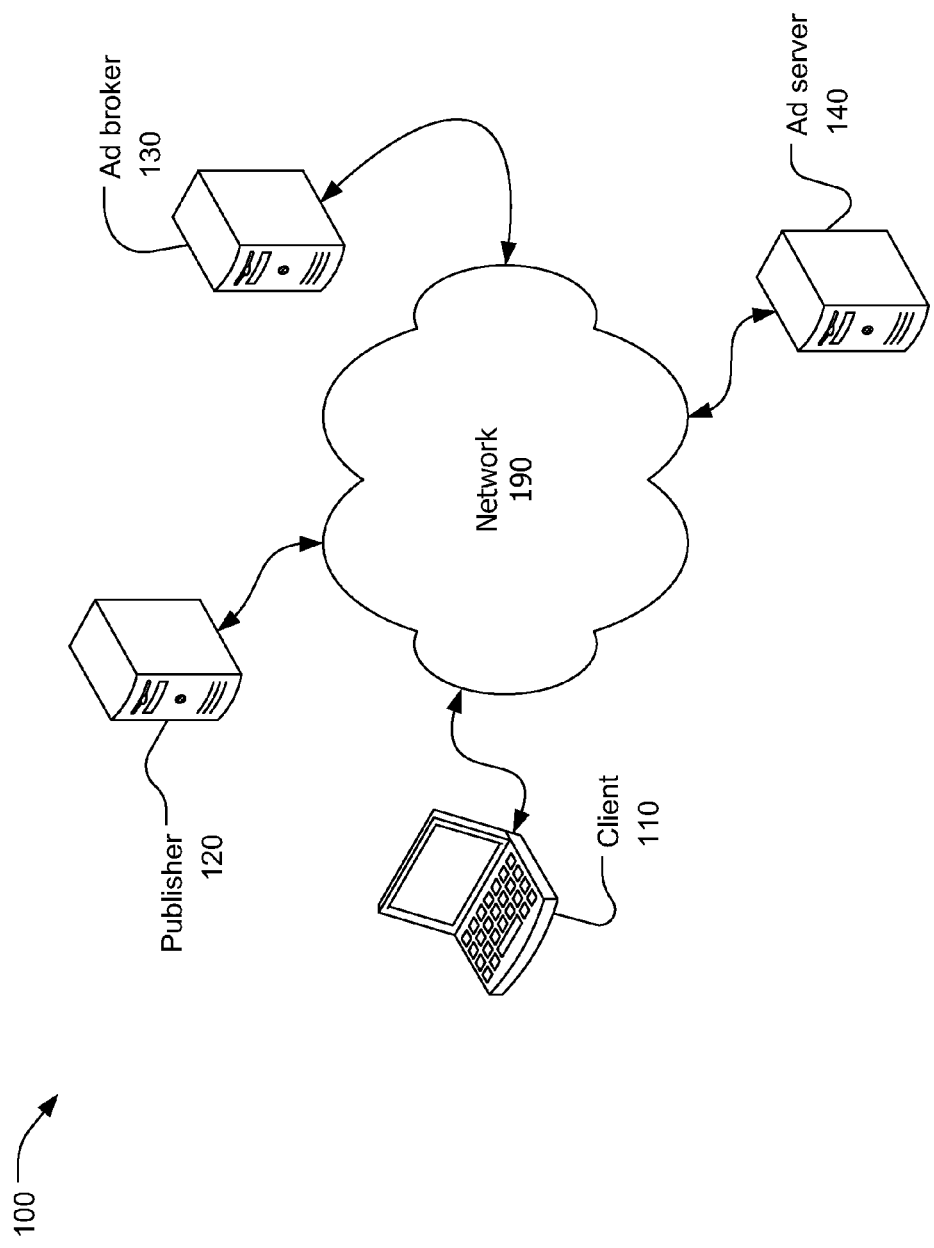
FIG. 1 is a block diagram of a network environment.

Referring now to FIG. 1, a network environment 100 may include a client computer 110, a publisher server 120, an ad broker server 130, and an ad server 140 coupled via a network 190. The network 190 may be or include the Internet. Although FIG. 1 shows, for ease of explanation, a single client computer and three servers, it must be understood that millions of clients and many thousands of servers may be connected to the Internet simultaneously.

The client computer 110 may be used by a "requestor" to access the Internet including the World Wide Web. Although shown as a portable computer, the client computer 110 may be any computing device including, but not limited to, a desktop personal computer, a portable computer, a laptop computer, a computing tablet, a set top box, a video game system, a personal video recorder, a telephone, or a personal digital assistant.

The publisher server 120 may store and "serve", or provide, web pages in response to requests received via the network 190 from other devices such as the client computer 110. When a web page to be served includes one or more regions allocated for ad units, the publisher server may request the ad broker server to provide data defining the ad units to be incorporated into the web page.

The ad broker server 130 may store contracts or rules defining relationships between the ad broker and a plurality of publishers and between the ad broker and a plurality of advertisers. When the publisher server 120 requests data identifying an ad to be placed in a web page, the publisher server may select an advertisement and provide the requested identifying data.

The ad server 140 may store one or more ad unit objects defining one or more ads. After an ad has been selected by the ad broker server 130, the ad server may provide the ad unit object for the select ad in response to a request from the publisher server 120 or the client computer 110.

The ad broker server 130 and the ad server 140 may be physically or geographically separate, or the ad broker server 130 and the ad server 140 may be combined in a single server or cluster of servers. The ad broker server 130 and the ad server 140 may be controlled by separate business entities or by a single business. Some or all of the publisher server 120, ad broker server 130 and the ad server 140 may be virtual servers within a cloud.

Figure 2:
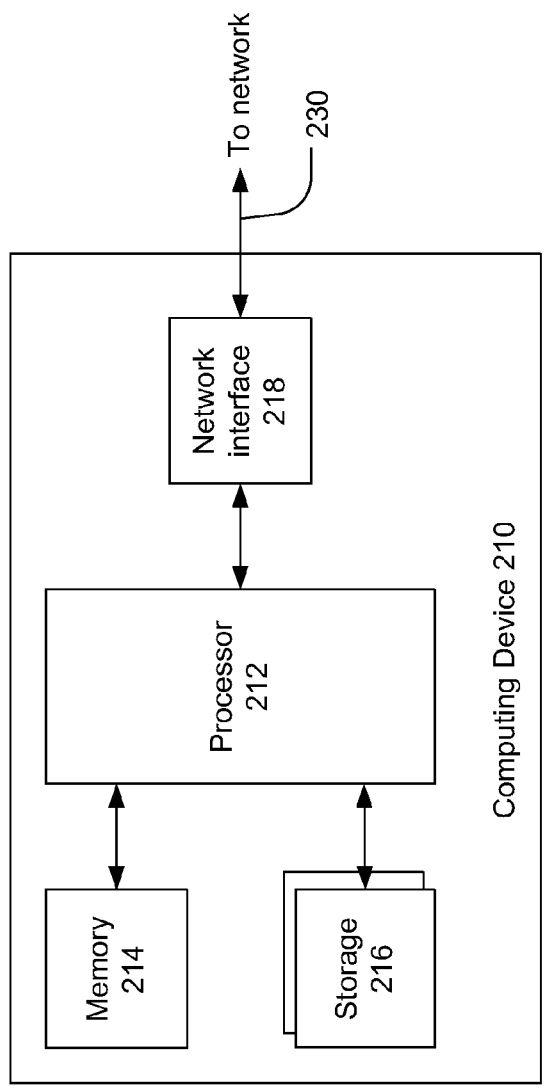
FIG. 2 is a block diagram of a computing device.

Each of the client computer 110, the publisher server 120, the ad broker server 130, and the ad server 140 may be a computing device 210, as shown in FIG. 2. The computing device 210 may include at least one processor 212, memory 214, and a network interface 218. Servers, in particular may contain a plurality of processors. The computing device 210 may include or be coupled to one or more storage devices 216. A client computer may also include or be coupled to a display device and user input devices, such as a keyboard and mouse, not shown in FIG. 2.

Each of the client computer 110, the publisher server 120, the ad broker server 130, and the ad server 140 may execute software instructions to perform the actions and methods described herein. The software instructions may be stored on a machine readable storage media a storage device such as the storage device 216. These storage media include, for example, magnetic media such as hard disks, floppy disks and tape; optical media such as compact disks (CD-ROM and CD-RW) and digital versatile disks (DVD and DVD±RW); flash memory cards; and other storage media. The term "storage media" is not intended to encompass a transient medium, such as a signal or a waveform, conveying software instructions or other data.

The client computer may run an operating system, including, for example, variations of the Linux, Microsoft Windows, Symbian, and Apple Mac operating systems. To access the Internet, the client computer may run a browser such as Microsoft Explorer or Mozilla Firefox, and an e-mail program such as Microsoft Outlook or Lotus Notes. Each of the publisher server 120, the ad broker server 130, and the ad server 140 may run an operating system and one or more application programs to perform the actions and methods described herein.

Each of the client computer 110 and the servers 120, 130, 140 may include various specialized units, circuits, firmware, software and interfaces for providing the functionality and features described here. The processes, functionality and features may be embodied in whole or in part in software executed by a processor. The hardware, firmware, and software and their functions may be distributed such that some function and features are performed by a processor and others by other devices.

Description of Processes

Figure 3:
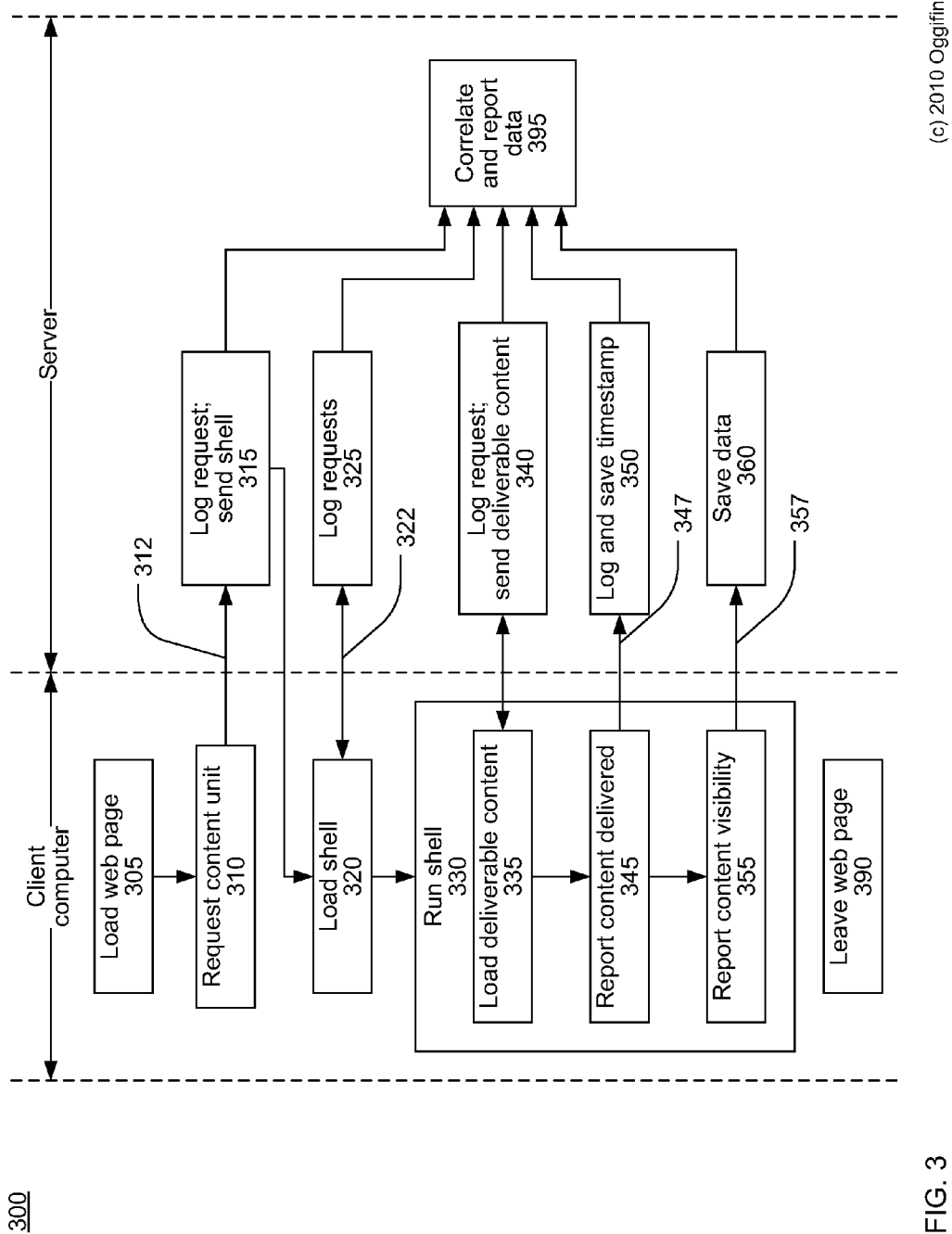
FIG. 3 is a flow chart of a method for tracking content abandonment rate.

FIG. 3 is a flow chart of a process 300 for tracking abandonment rates. In this patent, the term "content unit" means content that is incorporated by a client computer into a web page, but is provided by a party other than the publisher of the web page. Commonly, the content unit may be an ad unit. However, the process 300 may be used with other types of content. The process 300 may be performed by a client computer and a server, which may be the ad server 140 of FIG. 1, coupled by a network.

The process 300 may be considered to start at 305, when a client computer loads a web page, typically in response to an action by an operator or requestor. The process 300 may be considered to end at 390, when the requestor causes the client computer to leave the web page loaded at 305. The requestor may leave the web page at 390 by clicking on a link within the web page, by entering the URL of a new web page, by closing a web browser, or in some other manner. The process 300 may jump to 390 and leave the web page in response to a requestor action at any time during the process.

In this patent, the term "deliver" specifically means providing the multimedia content of a web page or other on-line content to a requestor or user. Delivering a web page or other on-line content may include incorporating static visual components, such as text and graphics, into the web page in a form suitable for displaying on a display device coupled to the client computer. However, delivered content need not actually be displayed. The vertical extent of a web page may commonly be greater than the vertical height of the display device on which the web page is displayed. In this case, the web page may include controls to allow a requestor to vertically scroll the portion of the web page actually visible on the monitor. Borrowing a term from newspapers, the portion of a web page that is visible when the web page is first rendered is referred to as "above the fold" and the portion of the web page that can only be seen by vertically scrolling the page is referred to as "below the fold". Advertising and other content placed above the fold is more likely to be seen by a requestor. Advertising and other content placed below the fold may never be seen by the requestor.

Delivering a web page or other on-line content may also include playing dynamic visual components, such as animations and video clips, on the display device. Delivering the content may also include playing one or more audio components. Some content units may include dynamic elements that are only played in response to an action by the requestor. In such cases, the content unit is considered to be delivered when such dynamic elements are loaded and ready to be played.

The process 300 will usually be cyclical in nature, since the process 300 may be repeated for some or all of plurality of web pages visited by the requestor while browsing the Web. The process 300 may be performed numerous times in parallel as web pages are concurrently provided to a large plurality of client computers. The process may also be performed multiple times in parallel if a single web page provides a plurality of advertisements.

At 305, the client computer may load a web page from a publisher server. The web page may include information identifying a content unit to be loaded from a server computer. The information identifying the content unit may include, for example, a script or call and a URI (uniform resource identifier) included in the web page.

After loading the web page from the publisher computer at 305, a browser program running on the client computer may render the first web page for delivery to the requestor. As part of rendering the first web page, at 310 the client computer may send a first message 312 requesting the content unit from a server computer in accordance with the information identifying the content unit contained in the web page. For example, at 310, the client computer may execute a script contained within the web page. When executed at 310, the script may cause the client computer to send the first message 312 requesting the content unit from the server computer.

In response to the first message 312 from the client computer, the server may download a first portion of the content unit to the client computer at 315. At 315, the server may also log the request from the client computer by making an entry in a log file. The log file entry may include, for example, a URL of the client computer, a client computer browser type, a date and time of the request based on a real-time clock within the server, a file name or other identifier of the requested content unit, and other information. The first message 312 received from the client computer may include a timestamp based on a real-time clock within the client computer, which may be saved by the server computer with the log file or separately.

Figure 4:
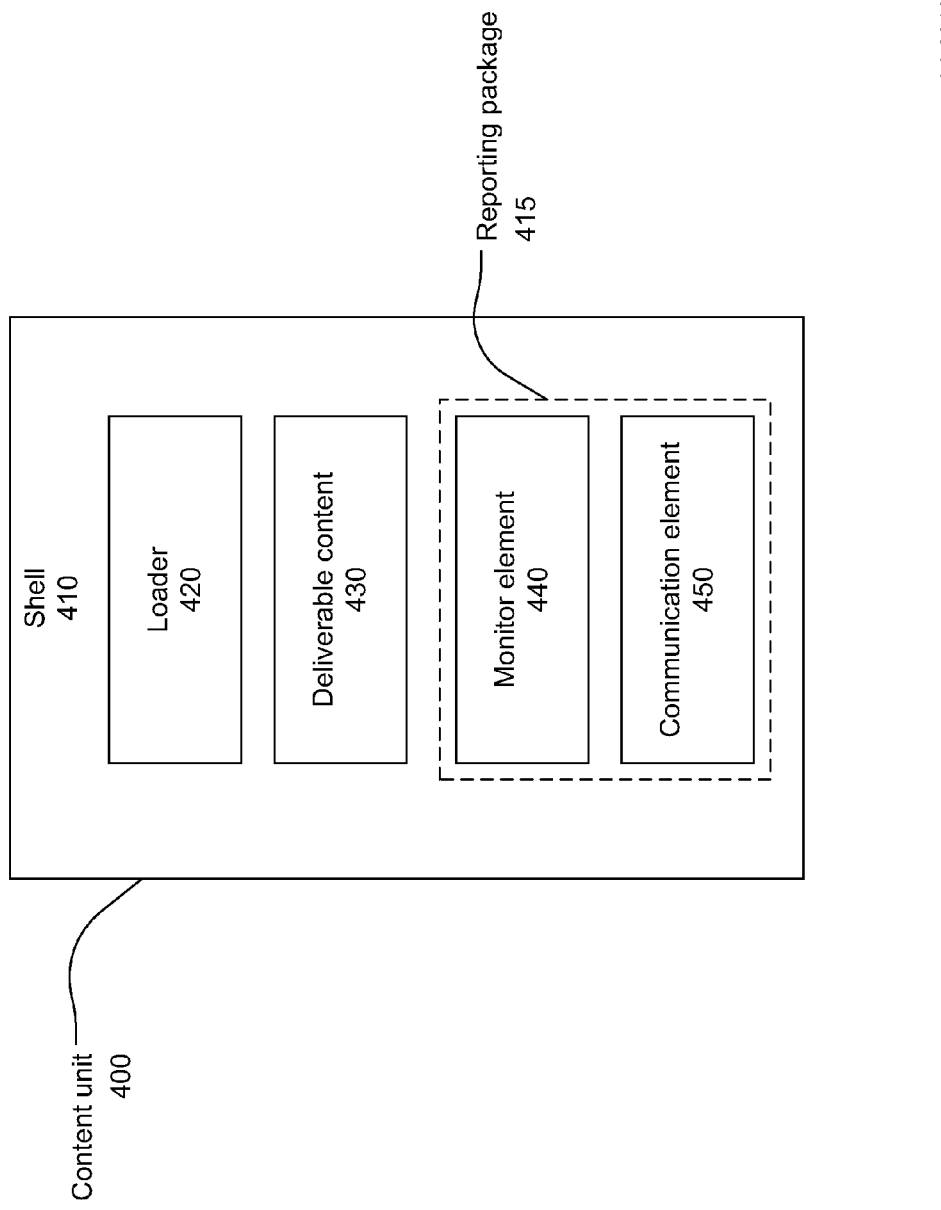
FIG. 4 is a graphical depiction of content unit.

Referring now to FIG. 4, a content unit 400 may include deliverable content 430, which is the visible and audio content actually delivered to a requestor. The content unit 400 may also include non-deliverable content including a shell 410, a loader 420, and a reporting package 415.

The shell 410 may be executable HTML code or other code that forms an outer layer of the content unit 400. The shell 410 may include or manage the loader 420 to load other elements of the content unit. The shell 410 may include a component for managing the interface between the content unit 400 and the client computer, the browser, and/or the requestor.

The deliverable content 430 may include instructions, data, and files required to generate and deliver an advertisement or other content within the web page loaded at 305. The deliverable content 430 may be, for example, a Flash object that may generate text, graphics, and/or animations and may load one or more images, video clips, and/or audio clips.

The reporting package 415 may be configured to accumulate and report information relating to the content unit. The reporting package 415 may be self-contained, which is to say that the reporting package 415 may accumulate and report information relating to the content unit without relying on elements of the web page loaded at 305, and without relying on the services of an intermediate party such as that ad broker 130.

The reporting package 415 may include a monitor element 440 to interface with the shell and a browser running on the client computer. The monitor element 440 may interface with the shell and the browser to determine if the deliverable content 430 has been delivered and to determine if the deliverable content 430 is positioned within the web page above or below the fold. The monitor element 440 may also interface with the shell and the browser periodically to determine if all or a portion of the deliverable content 430 is visibly displayed on a display device coupled to the client computer.

The reporting package 415 may also include a communication element 450 to interface between the content unit on the client computer and an external server. The communication element 450 may be an executable object, such as a JavaScript or ActionScript object, configured to send messages from the shell to the external server. The communication element 450 may be specifically configured to send status and monitoring messages from the shell to the server hosting the content unit 400.

Referring back to FIG. 3, the first portion of the content unit 400 downloaded at 315 may be a shell, such as the shell 410. While loading the shell and other portions of the content unit at 320, the client computer may send one or more requests 322 to the server computer to load one-by-one images to allow the server computer to roughly track the progress of loading the shell and content unit. The one or more requests may be logged by the server computer at 325.

After the shell is loaded at 320, the shell may be run, or executed, at 330. Executing the shell may cause the client computer to perform actions including requesting and loading deliverable content at 335. The server computer may log the request and provide the deliverable content at 340.

The client computer may deliver the deliverable content at 345. When the delivery is complete, the client computer may send a second message 347 to the server computer indicating that the content delivery has been completed. The second message 347 may include a timestamp indicating a time when the content delivery was completed. The timestamp may be derived, for example, from a real time clock within the client computer. The second message may be sent to the server computer via a communications element, such as the communications element 450, loaded as part of the content unit. The server computer may log the second message and save the timestamp, if present, at 350.

After the deliverable content is delivered, at 355 a monitor element loaded with the content unit (such as the monitor element 440) may query the browser program to determine if the deliverable content is positioned in the web page above or below the fold. The monitor element may also query the browser program to determine, at any given time point, if all or a portion of the deliverable content is actually visible on the display device coupled to the client computer. The monitor element may query the browser program periodically. At 355, the client computer may send one or more additional messages to the server computer. These additional messages may indicate whether or not the deliverable content is positioned above or below the fold in the web page, and whether or not the deliverable content is actually displayed on the display device. These additional messages may include data, based on a plurality of inquiries to the browser program, indicating what portion of the time elapsed since a previous message that the deliverable content was actually displayed. For example, the monitor element may query the browser program several times each second, and the results of a plurality of queries may be sent to the server computer at longer intervals such as several time per minute. The monitoring and reporting at 355 may continue until the client computer leaves the web page at 390.

At 395, the server computer may correlate and report data accumulated over a large number of repetitions of the actions from 300-390. The server may scan log files and correlate first messages received at 315 with corresponding second messages received at 350. Each instance where a first message was received and a second message was not received may be determined to be an abandonment. An abandonment rate may be calculated, for example by dividing a total number of abandonments by a total number of first messages received. The server computer may also calculate, by subtracting a timestamp associated with each first message from a timestamp associated with the corresponding second message, a load time for each instance where the content unit was successfully loaded. The server computer may also calculate minimum, maximum, and average load times and other data based on the timestamps.

At 395, the server computer may correlate second messages received at 340 with corresponding third messages received at 360. Based on the data contained in the third messages, the server computer may develop additional statistical data such as the percentage of content units placed below the fold, the percentage of content units that were never visible, and/or an average time that the content units were visibly displayed. Further statistical analysis may be done to relate parameters such a load times and average display time to factors such as the client computer browser type, the publisher, specific publisher web sites, and other factors.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for tracking abandonment rates, comprising:
   a client computer sending a first message to a server computer, the first message requesting a content unit to be incorporated into a web page;
   the client computer receiving, from the server computer, the content unit including deliverable content and a communications element configured to send messages generated by the content unit to the server;
   the client computer delivering the deliverable content; and
   when the delivery of the deliverable content is complete, the client computer sending a second message to the server via the communications element, the second message indicating that the delivery of the deliverable content has been completed, wherein the completing of the delivery of the deliverable content is independent of any action by an end user of the client computer in response to the deliverable content;
   wherein the content unit is determined to be abandoned by the server computer if the first message requesting the content unit is received and the second message indicating that the deliverable content has been delivered is not received.

2. The method of claim 1, wherein the content unit is an ad unit, the deliverable content is an advertisement, and the server is an ad server.

3. The method of claim 1, wherein the content unit comprises a shell which, when executed by the client computer, causes the client computer to perform actions including:
   loading the deliverable content and the communications element from the server;
   delivering the deliverable content; and
   sending the second message to the server via the communications element.

4. The method of claim 3, wherein the shell is HTML code that, when received by the client computer, incorporates itself into HTML code defining the first web page.

5. The method of claim 4, wherein the deliverable content includes a Flash object configured to inform the shell when delivery of the deliverable content is complete.

6. The method of claim 1, wherein the second message includes a timestamp indicating when the delivery of the deliverable content was complete.

7. The method of claim 3, wherein executing the shell causes the client computer to perform further actions, comprising:
   after the deliverable content is delivered, sending to the server computer one or more additional messages via the communications element, the additional messages indicating if all or a portion of the deliverable content is visible on a display device coupled to the client computer.

8. The method of claim 7, wherein executing the shell causes the client computer to perform further actions including:
   loading a monitor element from the server;
   periodically running the monitor element to determine if all or a portion of the deliverable content is visible on a display device coupled to the client computer; and
   sending additional messages to the server based on results from periodically running the monitor element.

9. A method for delivering online content, comprising:
   a server computer receiving a first message from a client computer, the first message requesting a content unit to be incorporated into a first web page; and
   in response to the first message, the server computer downloading to the client computer a shell that, when executed by the client computer, causes the client computer to perform actions including:
   loading, from the server, deliverable content for the requested content unit and a communications element configured to send messages generated by the shell to the server,
   delivering the deliverable content, and
   after delivery of the deliverable content when the delivery of the deliverable content is complete, sending a second message from the shell to the server via the communications element, the second message indicating that the delivery of the deliverable content has been completed, wherein the completing of the delivery of the deliverable content is independent of any action by an end user of the client computer in response to the deliverable content;
   the method further comprising the server computer determining if the content unit was abandoned, wherein the content unit is determined to be abandoned if the first message requesting the content unit is received and the second message indicating that the deliverable content has been delivered is not received.

10. The method of claim 9, wherein the content unit is an ad unit, the deliverable content is an advertisement, and the server is an ad server.

11. The method of claim 9, wherein the shell is HTML code that, when received by the client computer, incorporates itself into HTML code defining the first web page.

12. The method of claim 9, wherein the second message includes a timestamp indicating when the delivery of the deliverable content was complete.

13. The method of claim 9, further comprising:
after receiving the second message, the server computer receiving one or more additional messages indicating if all or a portion of the deliverable content is visible on a display device coupled to the client computer.

14. The method of claim 9, wherein the deliverable content includes a Flash object configured to inform the shell when delivery of the deliverable content is complete.

15. A method for determining advertising abandonment, comprising:
a server computer receiving a plurality of first messages from respective client computers, each first message requesting a content unit to be incorporated into a web page;
in response to each first message, the server computer downloading to the respective client computer the content unit including deliverable content and a communications element configured to send messages generated by the content unit to the server;
the server receiving a plurality of second messages from at least some of the client computers via the respective communications elements, each second message sent by the respective client computer when indicating that the delivery of the respective deliverable content has been completed, wherein the completing of the delivery of the deliverable content is independent of any action by an end user of the client computer in response to the deliverable content; and
for each of the plurality of first messages, the server computer determining if a corresponding second message was received, wherein the respective content unit is determined to be abandoned if the first message requesting the content unit is received and the second message indicating that the deliverable content has been delivered is not received.

16. The method of claim 5, wherein the content unit is an ad unit, the deliverable content is an advertisement, and the server is an ad server.

17. The method of claim 15, further comprising:
the server determining an abandonment rate based on the number of first messages received and the number of second messages received.

* * * * *